United States Patent [19]

Lai et al.

[11] Patent Number: 4,828,725
[45] Date of Patent: May 9, 1989

[54] COMPLETION FLUIDS CONTAINING HIGH MOLECULAR WEIGHT POLY(VINYLAMINES)

[75] Inventors: Ta-Wang Lai, Allentown; Bheema R. Vijayendran, Emmaus, both of Pa.

[73] Assignee: Air Products and Chemicals, Inc., Allentown, Pa.

[21] Appl. No.: 164,158

[22] Filed: Mar. 4, 1988

Related U.S. Application Data

[63] Continuation-in-part of Ser. No. 914,046, Oct. 1, 1986.

[51] Int. Cl.$^4$ .............................................. E21B 43/00
[52] U.S. Cl. ............................... 252/8.551; 525/328.2
[58] Field of Search ................. 252/8.551, 8.51, 8.514

[56] References Cited

U.S. PATENT DOCUMENTS

| | | | |
|---|---|---|---|
| 2,982,749 | 5/1961 | Friedrich et al. | |
| 3,278,506 | 11/1966 | Chamot et al. | |
| 3,284,393 | 11/1966 | Vanderhoff et al. | |
| 3,558,581 | 1/1971 | Beermann et al. | |
| 3,597,314 | 8/1971 | Laube et al. | 162/168 |
| 3,957,739 | 5/1976 | Cabestany et al. | 526/207 |
| 3,975,341 | 8/1976 | Trapasso | 526/303 |
| 4,018,826 | 4/1977 | Glass, Jr. et al. | 260/583 |
| 4,046,197 | 9/1977 | Gruesbeck et al. | 252/8.51 X |
| 4,078,133 | 3/1978 | Ozima | 526/80 |
| 4,217,214 | 8/1980 | Dubin | |
| 4,312,969 | 1/1982 | Becker et al. | 526/206 |
| 4,366,074 | 12/1982 | McLaughlin et al. | 252/8.551 |
| 4,421,602 | 12/1983 | Brunnmueller et al. | 162/168.2 |
| 4,490,261 | 12/1984 | Heilweil | 252/8.514 |
| 4,500,437 | 2/1985 | Engelhardt et al. | |
| 4,619,773 | 10/1986 | Heilweil et al. | 252/8.514 |
| 4,623,699 | 11/1986 | Brunnmueller et al. | 525/355 |
| 4,626,363 | 12/1986 | Gleason et al. | 252/8.514 |
| 4,699,722 | 10/1987 | Dymond et al. | 252/8.551 |

FOREIGN PATENT DOCUMENTS

| | | |
|---|---|---|
| 0120592 | 3/1984 | European Pat. Off. |
| 61-141712 | 6/1986 | Japan. |
| 2152929 | 8/1985 | United Kingdom. |

OTHER PUBLICATIONS

"Poly(vinylamine hydrochloride), Synthesis and Utilization for the Preparation of Water-Soluble Polymeric Dyes." D. J. Dawson et al, Jr., of the Am. Chem. Soc., 98:19, 19 Sep. 76, pp. 5996-6000.

"Synthesis of N-Vinylacetamide and Preparation of Some Polymers and Copolymers", R. W. Stackman et al, Ind. Eng. Chem. Prod. Res. Dev., 1985, 24, 242-246.

"Special Completion Fluids Outperform Drilling Muds," D. Acosta, IMCO Svcs., Houston Oil and Gas Journal, 2 Mar. 81.

J. K. Borchardt et al, "Clay Stabilizers Improve EOR Injection Rates", Oil & Gas Journal, p. 150, Sep. 10, 1984.

*Primary Examiner*—Herbert B. Guynn
*Attorney, Agent, or Firm*—Michael Leach; William F. Marsh; James C. Simmons

[57] ABSTRACT

The inverse emulsion polymerization of a monomer of the formula

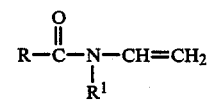

wherein R and R$^1$ represent hydrogen or a C$_1$-C$_4$ alkyl group, using a surfactant system having a hydrophilic-lipophilic balance value from 4 to 9, an azo-type free radical initiator and certain hydrocarbon liquids to yield a water-in-oil emulsion of a homopolymer of at least 10$^6$ average molecular weight, the emulsion having a viscosity less than 10 cps, at 15% solids, 60 rpm Brookfield and 20° C.

Also disclosed is the preparation of poly(vinylamines) of at least 10$^6$ average molecular weight by acid or base hydrolysis of the homopolymer emulsion.

Also disclosed are completion fluids for oil field applications containing the poly(vinylamines) and demonstrating superior properties.

19 Claims, No Drawings

COMPLETION FLUIDS CONTAINING HIGH MOLECULAR WEIGHT POLY(VINYLAMINES)

CROSS-REFERENCE TO RELATED APPLICATIONS

This application is a continuation-in-part of copending application Ser. No. 914,046 filed Oct. 1, 1986, which is hereby incorporated by reference.

TECHNICAL FIELD

The invention relates to the use of high molecular weight poly(vinylamines) in completion fluids for oil field applications.

BACKGROUND OF THE INVENTION

Water soluble polymers such as poly(N-vinylamides), frequently require high molecular weight to develop satisfactory properties for high performance applications. Low to medium molecular weight poly(N-vinylformamide) and poly(N-vinylacetamide) have been prepared by conventional solution polymerization in water and alcohols using oil-soluble and water-soluble initiators. However, poly(N-vinylamides) of high molecular weight are difficult to produce by conventional solution polymerization in that the polymer product obtained under useful conditions is a gel which is difficult to handle. In addition, problems with high solution viscosity and poor heat transfer make such synthesis impractical on a commercial scale.

Nonetheless, it was believed by the present inventors that the applications performance of poly(vinylamides) and poly(vinylamines) could be enhanced by the preparation and use of homopolymers of very high molecular weight ($>10^6$).

European patent application Pub. No. 0120592 discloses a method of stabilizing fines in structures such as permeable subterranean formations using certain polycationic polymers.

U.S. Pat. No. 4,500,437 discloses acrylamide copolymers and terpolymers containing N-vinylformamide and N-vinylacetamide prepared by inverse emulsion polymerization in Examples 67–70 with the polymers of Examples 68 and 70 having a molecular weight below 100,000; i.e. $<10^5$. Example 20 shows the preparation of poly(vinylformamide) by solution polymerization.

U.S. Pat. No. 4,421,602 discloses linear basic polymers containing from 90 to 10 mole% of copolymerized vinylamine units and from 10 to 90 mole% of copolymerized N-vinylformamide units. This patent teaches that the polymers can be prepared by solution polymerization in water, a water-soluble solvent or a mixture of water and a water-soluble solvent and actually shows such solution polymerization in the examples. It is suggested that the polymerization can also be carried out as a water-in-oil emulsion polymerization in a water-immiscible solvent, but there are no examples of such polymerization.

U.S. Pat. No. 4,018,826 discloses the preparation of poly(vinylamine) salts of mineral acids by polymerizing vinylacetamide with a free radical polymerization catalyst, and hydrolyzing the poly(vinylacetamide) to the desired amine salts by contacting the poly(vinylacetamide) with an aqueous solution of the corresponding mineral acid. Poly(vinylamine) product of about 3,000 to about 700,000 molecular weight (4,000 to bout 1,000,000 for the salt product) is suggested.

U.S. Pat. No. 3,558,581 discloses homo- and copolymers of N-vinyl-N-methyl-amine by hydrolysis of the corresponding polymers of N-vinyl-N-methyl-formamide with mineral acids.

U.S. Pat. No. 3,597,314 discloses a water-soluble polymer consisting essentially of units derived from N-vinyl-N-methylformamide having 60–100% of the formic acid radicals of the polymer split off by acid hydrolysis. There is no disclosure regarding inverse emulsion polymerization.

GB No. 2,152,929 is directed to a process for producing N-substituted formamides for use in producing N-vinylformamide by thermally decomposing N-(alpha-alkoxyethyl)formamide in the gas phase. It is suggested that the N-vinylformamide can be bulk polymerized, solution polymerized using an aqueous solution or an organic solution, or emulsion polymerized singly or together with a monomer used conventionally for producing water-soluble polymers suitable for making flocculants, in the presence of a polymerization initiator of azo compounds. The thus obtained poly(vinylformamide) is hydrolyzed under acidic or basic conditions to obtain a cationic polymer of poly(vinylamines).

D. J. Dawson, et al., "Poly(vinylamine hydrochloride). Synthesis and Utilization for the Preparation of Water-Soluble Polymeric Dyes," J. Am. Chem. Soc., 98: 19, 5996 (1976) discloses the preparation of N-vinylacetamide and its polymerization in solution followed by acid hydrolysis to poly(N-vinylamine hydrochloride).

Representative of the numerous prior art references relating to water-in-oil emulsion polymerization of water-soluble monomers are the following U.S. Pat. Nos.: 2,982,749; 3,284,393; 3,957,739; 3,975,341; 4,078,133; and 4,312,969.

R. H. Summerville, et al., "Synthesis of N-vinyl Acetamide and Preparation of Some Polymers and Copolymers, "Polym. Reprints, 24, 12 (1983) discloses that the inverse emulsion polymerization of N-vinyl-acetamide initiated by sodium persulfate in water and cyclohexane using Igepal surfactants was tried without success.

U.S. Pat. No. 4,217,214 discloses that polyvinylamine hydrochloride having a molecular weight of about $5\times10^5$ or greater has been found to be particularly effective as a flocculating agent in wastewater systems. The examples disclose the use of a poly(vinylamine) hydrochloride having a molecular weight of $2\times10^6$ and state that the poly(vinylamine) hydrochloride used is prepared as described in U.S. Pat. No. 4,018,826.

U.S. Pat. No. 4,623,699 discloses linear, basic polymer powders which contain units of the formula —CH$_2$—CH(NH$_2$)— and have a Fikentscher K value from 10 to 200 are prepared by eliminating the formyl groups from N-vinyl-formamide polymer powders with a gaseous hydrogen halide in the presence of not more than 5% by weight, based on the polymer used, of water. Polymers of this type, as well as polyvinylamines, are said to be useful, for example, as flocculents for waste waters and sludges and as retention agents, drainage agents and as flocculents in papermaking.

JP No. 61/141712 discloses a method for producing N-vinylcarboxylic acid amide polymers by a procedure in which an aqueous solution of N-vinylcarboxylic acid amide is dispersed in a hydrocarbon-type dispersing medium using an oil-soluble polymer dispersion stabilizer followed by radical polymerization.

SUMMARY OF THE INVENTION

According to the present invention, very high molecular weight poly(N-vinylamides) can be prepared by an inverse emulsion polymerization process. The present invention provides an inverse homopolymer emulsion consisting essentially of 10-70 wt% of an aqueous solution containing 10-90 wt% of a homopolymer of an N-vinylamide of the formula

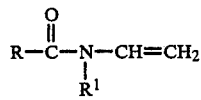

wherein R and $R^1$ represent hydrogen or a $C_1$–$C_4$ alkyl group, colloidally dispersed in a hydrocarbon liquid which is a $C_5$–$C_{10}$ alkane and, in addition, toluene and xylene when R=alkyl, a xylene compound, the homopolymer being at least $10^6$ average molecular weight and the emulsion possessing a viscosity less than 10 cps at 15% solids, 60 rpm Brookfield (7.9 sec$^{-1}$) and 20° C.

The method for preparing the inverse, or water-in-oil, emulsion involves colloidally dispersing an aqueous solution containing 10-90 wt% water-soluble N-vinylamide of the above formula in the hydrocarbon liquid using a surfactant having an HLB value from 4 to 9, the weight ratio of monomer-containing aqueous solution to hydrocarbon liquid being preferably in the range from 1:2 to 2:1, and polymerizing the monomer using an azo-type free radical initiator.

The resultant very high molecular weight polymer emulsion has a low viscosity ranging from 2 to less than 10 cps at 15% solids, 60 rpm Brookfield and 20° C., thus eliminating problems of solution viscosity which arise when the polymer is prepared by a solution polymerization process. In addition, the low viscosity homopolymer emulsion is easy to handle and can be used directly.

One such use of the vinylamide homopolymer emulsions is in the preparation of vinylamine homopolymers of at least a $10^6$ average molecular weight by acid or base catalyzed hydrolysis of the homopolymer, preferably as the emulsion. The use of the mineral acid in the hydrolysis step or in acidifying the base hydrolysis product provides the poly(vinylamine) as the salt of such acid.

The very high molecular weight derived poly(vinylamines) have application in oil field chemical compositions such as completion fluids. Solution rheology (thickening efficiency and viscosity response to shear rates in the range of 1 to 1,000 sec$^{-1}$) of the poly(vinylamines) at a 0.5 to 1% concentration in low level salt solutions, e.g. 2% KCl solution, is important in oil field chemical compositions for many applications. The very high molecular weight of the polymers affords better viscosifying of fluids used in oil well and gas production.

Also provided by the invention are completion fluids for oil field use exhibiting high viscosity in saturated brine solution as well as high temperature viscosity stability. A typical completion fluid comprises a saturated salt solution containing 0.2 to 2 wt% poly(vinylamine).

DETAILED DESCRIPTION OF THE INVENTION

Poly(N-vinylamides) of molecular weight at least $10^6$, preferably $3 \times 10^6$ to $15 \times 10^6$, are prepared via an inverse emulsion polymerization process by reacting the following composition under an inert atmosphere:

1. water-soluble N-vinylamide monomer,
2. water,
3. hydrocarbon liquid,
4. water-in-oil emulsifying agent, and
5. a nitrogen-containing free radical initiator.

The aqueous solution comprising the first two components contains 10 to 90 wt%, preferably 50 to 70 wt%, of a water-soluble N-vinylamide of the formula

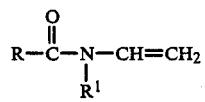

where R and $R^1$ represent hydrogen or an alkyl group having 1-4, preferably 1-2, carbon atoms, especially a methyl group. The weight ratio of monomer-containing aqueous solution to hydrocarbon liquid may be varied widely depending upon the monomer used, but preferably is about 1:2 to 2:1.

The suitable hydrocarbon liquids for use in the invention are immiscibe with water and do not significantly dissolve the monomers in the presence of water. Such hydrocarbon liquids are exemplified by acyclic and cyclic $C_5$–$C_{10}$ alkanes such as hexane, octane, decane, and decahydronaphthalene (decalin) and, in addition, certain aromatic hydrocarbons for N-vinylacetamides and the aromatic hydrocarbons toluene and xylene. Contemplated as the functional equivalent of toluene and xylene when R is an alkyl group in the monomer formula are ethylbenzene and tetrahydronaphthalene (tetrain). The preferred hydrocarbon liquids are the $C_5$–$C_{10}$ acyclic alkanes.

The stabilizing system comprises suitable emulsifying agents, or surfactants, having a hydrophilic-lipophilic balance (HLB) value from 4 to 9, preferably 4 to 7.5, and include sorbitan fatty acid esters such as sorbitan monostearate, oleate, laurate or palmitate; polyoxyethylene sorbitan fatty acid esters, i.e. reaction products of one mole of the aforementioned sorbitan fatty acid esters with from 4 to 40 moles of ethylene oxide; polyoxyethylene sorbitol esters of fatty acids; and mixtures thereof. The preferably quantity of surfactant is 5 to 20 wt% based on the monomer-containing aqueous solution.

The free radical initiator should be one of the azo compounds well known in the polymerization art such as 2,2'-azobis(isobutyronitrile); 2,2'-azobis(2-amidinopropane) hydrochloride; 4,4'-azobis(4'-cyanopentanoic acid) and the like. Persulfates and hydrogen peroxide have been found not to be suitable in practicing the invention. Redox catalyst systems may also be used comprising the azo initiators with a reducing agent typically used in the art. The amount of free radical initiator can be varied widely depending upon reaction temperatures, rate of polymerization, degree of polymerization to be obtained, but preferably is in the range of 0.001 to 0.5 mole% of the monomer used.

The polymerization is usually carried out under an inert atmosphere, preferably under nitrogen. The reaction temperature is preferably in the range of 40°–60° C. A high temperature, i.e. >60° C., may cause side reactions unfavorable to the polymer such as crosslinking or chain transfer. A lower temperature may be impractical because of long reaction times.

The homopolymer product can be isolated from the emulsion by adding a flocculating agent and filtering. The precipitated product is then washed and dried. Generally, a polar organic solvent which is a good solvent for the surfactant but a poor solvent for the polymer, e.g. acetone, is used to aggregate the polymer. The precipitated polymer is filered and washed to remove the surfactant. The dried and purified polymer of very high molecular weight is in the form of a fine powder and is water soluble.

The vinylamide homopolymer products are hydrolzyed to vinylamine homopolymers of at least $10^6$ average molecular weight in the presence of acids or bases. More desirably, vinylamine homopolymers of $1.8 \times 10^6$ to $9 \times 10^6$ molecular weight or more are obtained. The vinylamine polymers suitable for use in completion fluids are at least 10% hydrolyzed and desirably greater than about 50% hydrolyzed, preferably greater than about 90%, to about 99+% hydrolyzed.

Suitable acids for the hydrolysis include mineral acids such as hydrochloric, hydrobromic, sulfuric, phosphoric and perchloric acid; and organic acids such as trifluoroacetic acids and methanesulfonic acid. The bases which can be employed include alkali and alkaline earth hydroxides such as sodium hydroxide, potassium hydroxide, calcium hydroxide and barium hydroxide; and quaternary ammonium hydroxides such as tetramethyl ammonium hydroxide. The quantity of the acid or base required may vary widely, depending upon the degree of hydrolysis desired and reaction conditions. Approximately, 1 to 3 equivalents of the acid or base per equivalent of the polymer is preferred to achieve essentially complete hydrolysis.

The hydrolysis can be performed in various solvents, including water; liquid ammonia; alcohols such as methanol, ethanol, isopropanol, and t-butanol; amines such as methylamine, dimethylamine, ethylamine and the like; and hydroxy amines such as ethanolamine. However, it is much preferred to simply add the acid or base in water to the water-in-oil emulsion.

The temperature of the hydrolysis may range from 20° to 200° C. depending upon the type of polymer and hydrolysis employed. Generally, hydrolysis proceeds more rapidly for poly(N-vinylformamide) than for poly(N-vinylacetamide). Thus, hydrolysis of poly(N-vinylformamide) can be carried on under milder conditions, i.e. at lower temperatures and shorter reaction times than for poly(N-vinylacetamide). The preferable temperature range of a base hydrolysis is 70° to 100° C. which is lower than that of acid or base hydrolysis of N-vinylacetamide in the range of 110° to 200° C.

The hydrolyzed polymer products thus obtained comprise the repeating free amino-containing units of the formula

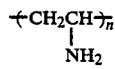

in the case of base hydrolysis, and amino-containing units of the formula

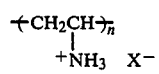

in the case of acid hydrolysis, where $X^-$ represents the anion corresponding to the acid employed in the hydrolysis.

Poly(vinylamine) is preferably isolated in the salt form to prevent adsorption of atmospheric carbon dioxide. The polymer salt is isolated by acidifying the hydrolysis mixture to cause the polymer to precipitate. The precipitated polymer generally is a gum, but a fibrous material can be obtained after redissolving, followed by reprecipitation in methanol.

The products of this invention are high molecular weight poly(N-vinylamides), especially poly(N-vinylformamide) of $3-15 \times 10^6$ mol wt and poly(N-vinylacetamide) of $1.3-5 \times 10^6$ mol wt, and the derived poly(vinylamine) and poly(vinylamine) salts.

These polymeric materials may also contain up to 25 wt% copolymerizable monomers such as, for example, acrylamide, N-vinylpyrrolidone, sodium vinyl sulfonate and acrylamidomethyl propane sulfonic and (sodium salt), provided the polymer maintains sufficient water solubility.

With regard to completion fluids, such compositions comprise a saturated aqueous salt, or brine, solution containing about 0.2 to 2 wt% high molecular weight poly(vinylamine) and preferably 0.5 to 2 wt% polymer. The polymer is added to the saturated salt solution in order to viscosify the fluid. The salt may be NaCl, KCl, $CaCl_2$, $Na_2CO_3$, $K_2CO_3$, NaBr, $CaBr_2$, $ZnCl_2$, $ZnBr_2$ or other suitable salt.

Completion fluids are designed to maximize the recovery of hydrocarbons from existing reservoirs and should: control subsurface pressures, provide minimum damage to producing zones, maintain hole stability, transport all movable solids to the surface, minimize corrosion, remain rheologically stable at elevated temperatures and be compatible with the producing formation. (D. Acosta, "Special Completion Fluids Outperform Drilling Muds," *Technology*, Gas and Oil Journal, 2 Mar. 1981, pp. 83–86).

EXAMPLE 1

This Example shows a preparation of a very high molecular weight poly(N-vinylformamide) by inverse emulsion polymerization.

Sorbitan monostearate (SPAN 60 surfactant, HLB 4.7, 2.5 g) was dissolved in octane (90 g) and the resulting solution was transferred to a reaction kettle. The reactor was purged with nitrogen and kept in a nitrogen atmosphere throughout the polymerization. The N-vinylformamide solution (15 g in 30 g of water) was degassed and added to the reactor at the rate of 2.5 ml/min with vigorous agitation. (The N-vinylformamide was purified by vacuum distillation at 70° C., 1 torr, prior to use.) While the reaction mixture was heated to 50° C., 2,2'-azobis(2,4-dimethyl-pentanitrile) (Vazo 52 initiator, 0.05 g) was charged. After 3 hours at 50° C. with agitation, a stable polymeric emulsion was produced having a viscosity of 3 cps. The solid polymer product was recovered by breaking the emulsion by the addition of acetone. The isolated N-vinylformamide homopolymer had a molecular weight of $6.7 \times 10^6$ as measured by light scattering and a viscosity of 21,000 cps as a 5% solution.

EXAMPLE 2

The vinylformamide homopolymer (10 g) of Example 1 was dissolved in water (990 g) and then mixed with 50% aqueous sodium hydroxide (11.3 g). The resulting mixture was heated for 8 hours at 80° C. under a nitrogen atmosphere. To the reaction mixture was added concentrated hydrochloric acid until the polymer precipitated. The acid solution was decanted. The precipitated polymer was redissolved in water and reprecipitated with methanol. The vinylamine homopolymer hydrochloride salt had a viscosity of 400 cps at 1% aqueous solution.

EXAMPLE 3

This Example shows the preparation of a very high molecular weight poly(N-vinylacetamide) by inverse emulsion polymerization.

The N-vinylacetamide was prepared according to the method taught in U.S. Pat. No. 4,018,826. The N-vinylacetamide was purified as follows: The crude N-vinylacetamide (1 kg) was flash distilled at 70°–74° C., 1 torr. Approximately two-thirds of the material was distilled to give a 70:30 N-vinylacetamide/acetamide mixture. This mixture (100 g) and toluene (600 g) were placed in a 1000 ml beaker and the resulting mixture was stirred well. The yellow toluene solution was decanted from insoluble solids which were washed twice with 50 g of fresh toluene. The toluene solutions were combined and washed with 25 g of brine. The yellow brine solution was discarded. The toluene solution was then extracted four times with 130 ml of water. The aqueous solution was back extracted with 25 ml of methylene chloride. The methylene chloride solution was discarded. The aqueous solution was saturated with sodium chloride and extracted four times with 330 ml methylene chloride. After removing the methylene chloride under reduced pressure, 42 g of pure N-vinylacetamide (60% recovery) was obtained.

A mixture of N-vinylacetamide (15 g), wateer (45 g), xylene (90 g), and SPAN 60 surfactant (4 g) was polymerized in the same manner as described in Example 1, using 2,2'-azobis(2-methylpropionitrile) AIBN (0.08 g) as an initiator. The N-vinylacetamide homopolymer was precipitated by addition of acetone, and had a molecular weight of $1.5 \times 10^6$, as determined by gel permeation chromatography.

EXAMPLE 4

The N-vinylacetamide homopolymer of Example 3 (10 g) was dissolved in water and mixed with concentrated hydrochloric acid (2 mole equivalents). The resulting mixture was heated to reflux (about 110° C.) for 48 hours. To the reaction mixture was added concentrated hydrochloric acid until the polymer precipitated. The acid solution was decanted. The precipitated polymer was redissolved in water and reprecipitated with methanol yielding 8.8 g of product having a viscosity of 324 cps as a 1% aqueous solution.

EXAMPLES 5–9

N-vinylformamide (NVF) was polymerized in the same manner as described in Example 1. The data regarding the polymerization recipes and the resulting emulsions are set forth in Tables 1 and 2, respectively.

TABLE 1

| EXAMPLE | NVF(g) | WATER(g) | HYDROCARBON(g) | SPAN 60(g) | VAZO 52(g) | ADDITIVE(g) |
|---|---|---|---|---|---|---|
| 5 | 15 | 30 | Octane 55 | 2.5 | 0.05 | — |
| 6 | 15 | 30 | Octane 55 | 2.5 | 0.05 | 0.25 Vinol 125 |
| 7 | 15 | 30 | Octane 75 | 2.5 | 0.05 | — |
| 8 | 15 | 30 | Hexane 90 | 2.5 | 0.05 | — |
| 9 | 15 | 30 | Hexane 90 | 2.5 | 0.05 | 0.25 Poly(vinylamine) |

TABLE 2

| EXAMPLE | EMULSION VISCOSITY (cps) | HOMOPOLYMER MOLECULAR WEIGHT |
|---|---|---|
| 5 | 4 | $7 \times 10^6$ |
| 6 | 4 | $7 \times 10^6$ |
| 7 | 4 | $6 \times 10^6$ |
| 8 | 4 | $6 \times 10^6$ |
| 9 | 4 | $6 \times 10^6$ |

EXAMPLE 10

In this example the inverse emulsion polymerization of N-vinylformamide according to Example 1 was attempted using toluene, xylene and kerosene individually as the hydrocarbon liquid phase. In each instance a high molecular weight N-vinylformamide polymer was obtained, but the emulsions were unstable and broke.

EXAMPLE 11

As can be seen in Table 3 the high molecular weight vinylamine homopolymer demonstrated a surprisingly high viscosity in saturated brine solutions compared to the industry standard hydroxdyethyl cellulose. A high viscosity property is important in completion fluids used in oil wells.

The saturated salt solution was prepared by mixing 1 g of a polymer into 100 g of saturated salt solution and measuring the viscosity.

TABLE 3

| Polymer | Viscosity in Saturated Salt Solution (cps) | |
|---|---|---|
| | NaCl | CaCl$_2$ |
| VAm (0.6 MM) | 3 | 100 |
| VAm (7 MM) | 11.5 | 300 |
| Hercules 250 HHR (2–4 MM) Hydroxyethylcellulose | 4 | 250 |

STATEMENT OF INDUSTRIAL APPLICATION

The present invention provides very high molecular weight poly(N-vinylamides) by inverse emulsion polymerization and derived poly(vinylamines) having application in completion fluids for oil wells.

We claim:

1. A completion fluid consisting essentially of a saturated aqueous salt solution containing as a viscosifier 0.2 to 2 wt% hydrolyzed polymer of an N-vinylamide of the general formula

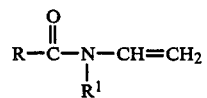

where R and $R^1$ represent hydrogen or a $C_1$–$C_4$ alkyl group, the polymer being at least $10^6$ average molecular weight and greater than about 50% hydrolyzed to vinylamide units, said polymer being a homopolymer of said N-vinylamide or a copolymer thereof with up to 25 wt. percent of a copolymerizable monomer.

2. The completion fluid of claim 1 in which the poly(vinylamide) has a $1.3-15\times10^6$ average molecular weight.

3. The completion fluid of claim 1 in which the poly(vinylamide) has a $1.8-9\times10^6$ average molecular weight.

4. The completion fluid of claim 1 which the poly(vinylamide) is greater than about 90% hydrolyzed to vinylamine units.

5. The completion fluid of claim 1 which contains about 1% of a hydrolized poly(vinylamide) of $7\times10^6$ average molecular weight.

6. The completion fluid of claim 1 in which R is methyl and $R^1$ is hydrogen.

7. The completion fluid of claim 1 in which R and $R^1$ are hydrogen.

8. In a completion fluid comprising an aqueous saturated salt solution and a viscosifying polymer, the improvement which comprises as the viscosifying polymer 0.2 to 2 wt% hydrolyzed polymer of an N vinylamide of the general formula

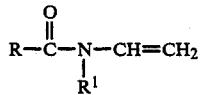

where R and $R^1$ represent hydrogen or a $C_1-C_4$ alkyl group, the polymer being at least $10^6$ average molecular weight and greater than about 50% hydrolyzed to vinylamine units, said polymer being a homopolymer of said N-vinylamide of a copolymer thereof with up to 25 wt. percent of a copolymerizable monomer.

9. The fluid of claim 8 in which the poly(vinylamide) has a $1.8-9\times10^6$ average molecular weight.

10. The completion fluid of claim 8 in which R is methyl and $R^1$ is hydrogen.

11. The completion fluid of claim 8 in which R and $R^1$ are hydrogen.

12. The completion fluid of claim 8 in which the poly(vinylamide) is about $7\times10^6$ average molecular weight.

13. The completion fluid of claim 12 in which the poly(vinylamide) is about 99+% hydrolyzed to vinylamide units.

14. The fluid of claim 8 in which the poly(vinylamide) is $1.3-15\times10^6$ average molecular weight.

15. The fluid of claim 14 in which the poly(vinylamide) is greater than about 90% hydrolyzed to vinylamide units.

16. The fluid of claim 15 which contains 0.5 to 2% hydrolyzed poly(vinylamide).

17. The fluid of claim 11 which contains about 1% of a hydrolyzed poly(vinylamide) of $7\times10^6$ average molecular weight.

18. The fluid of claim 14 in which the poly(vinylamide) is about 99+% hydrolyzed to vinylamine units.

19. The completion fluid of claim 18 in which the poly(vinylamide) is about $7\times10^6$ average molecular weight.

* * * * *